United States Patent Office 3,285,863
Patented Nov. 15, 1966

3,285,863
POLYMERS FROM PHOSPHONITES AND DIOLS
Richard L. McConnell and Harry W. Coover, Jr., Kingsport, Tenn., assignors to Eastman Kodak Company, Rochester, N.Y., a corporation of New Jersey
No Drawing. Filed Oct. 21, 1964, Ser. No. 405,566
16 Claims. (Cl. 260—2)

This application is a continuation-in-part of earlier application Serial No. 78,290, filed on December 27, 1960, and now abandoned.

This invention relates to a new class of organo phosphorus polymers and a process for producing them. These novel polymers are advantageously derived from the reaction of a phosphonite ester with a diol selected from the group consisting of alkylene glycols, poly(alkylene glycols), cycloalkylene glycols and bis(hydroxyphenyl) alkanes. Polymers from acyclic diols are valuable plasticizers, lubricants and the like, whereas the other polymers form quite useful fibers, films and the like, all of which have great flame resistance and hydrolytic stability.

It is an object of this invention to provide a new class of linear organic polymers as well as a process for their preparation.

It is a further object of this invention to provide new polymers containing phosphorus which are extremely flame-resistant, and can be formed into fibers having utility for not only the various normal applications for which fibers are intended, but also with regard to coatings, film, molding compositions, etc.

An additional object is to provide such polymers which are characterized by unexpectedly superior hydrolytic stability.

Other objects will become apparent elsewhere herein.

The polymers of this invention are generally characterized by having softening temperatures above 0° C., being extremely flame-resistant, and having unexpectedly great resistance to hydrolysis. Such polymers are fiber-forming and especially useful for such a purpose when having a softening temperature of at least 100° C.

More specifically this invention provides a linear organophosphorus polymer having, as the polymer chain, a recurring structural unit having the following formula:

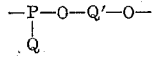

wherein Q represents a monovalent organic radical selected from the group consisting of aliphatic hydrocarbon radicals containing from 1 to 12 carbon atoms, aromatic hydrocarbon radicals containing from 6 to 12 carbon atoms and aralkyl hydrocarbon radicals containing from 7 to 12 carbon atoms, and Q' represents a bivalent organic radical selected from the group consisting of alkylene radicals containing from 4 to 20 carbon atoms, polyoxyalkylene radicals containing from 4 to 900 carbon atoms, cycloalkylene radicals containing from 6 to 20 carbon atoms and bisphenylalkane radicals containing from 13 to 25 carbon atoms.

According to another embodiment of this invention there is provided a process for making such a linear organophosphorus polymer having a softening temperature above 50° C., being extremely flame-resistant and resistant to hydrolysis, comprising heating together at from 100° to 350° C. a bifunctional phosphonite having the formula:

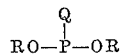

and an approximately equimolecular amount of a bifunctional dihydroxy compound having the formula:

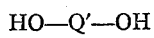

wherein Q and Q' are as defined above and R represents an organic radical selected from the group consisting of an alkyl radical containing from 1 to 6 carbon atoms and an aryl radical of the benzene series containing from 6 to 9 carbon atoms.

It is preferred that the process just defined be carried out in the presence of an ester exchange catalyst and during at least the latter part of the reaction the process is preferably conducted employing vacuum until substantially all of the R—OH by-product is eliminated. The ester exchange catalysts are a well known class of compounds and need not be extensively described herein; however, it has been unexpectedly found that an alkali metal aluminate, i.e. sodium aluminate produces an especially advantageous catalytic effect.

Although temperatures for the process are advantageously set forth above, the temperature can range from 25° C. or less (at least 100° C. is preferred) up to 400° C. or higher. Of course, low temperatures require longer reaction periods and the maximum temperature will be limited by the properties of the reactants, the properties of the by-products and the nature of the equipment being used, having in mind that excessively high temperatures cause decomposition.

The number of recurring structural units in the linear polymers of this invention is not precisely known but is considered to be a large number of such recurring units, e.g. at least 5 on the average.

Although catalysts are not essential, it is preferred to use a catalyst such as sodium aluminate. Other catalysts include titanium alkoxides, the alkali metals, sodium amide, sodium dialkyl phosphites, sodium diaryl phosphites, sodium or potassium alkoxides, sodium titanium alkoxides, aluminum trichloride, dibutyl oxide, etc. In general, the reactions can be effected without the use of a solvent.

Suitable diols which may be used in this reaction include: cis or trans-1,4-cyclohexanedimethanol; cis or trans-1,3-cyclohexanedimethanol; 2,5- or 2,6-norcamphanedimethanol; 2,2,4,4-tetramethyl-1,3-cyclobutanediol; 1,4-butanediol; 1,5-pentanediol; 1,4-cyclohexanediol; 4,4'-isopropylidenedicyclohexanol; etc. Usually the number of carbon atoms in the chain separating the hydroxy groups contains from 4 to 8 carbon atoms. It is important that the hydroxy radicals be separated by more than 3 carbon atoms since glycols wherein the hydroxy groups are separated by 3 or less carbon atoms generally lead to the formation of cyclic organophosphorus compounds and not to organophosphorus polymers. One exception to this rule is 2,2,4,4-tetramethyl-1,3-cyclobutanediol which gives polymers and not cyclic products.

Of course, a great number of aliphatic dihydroxy compounds coming within the scope of the general description set forth above can be employed.

Typical bis(hydroxyphenyl) alkanes which may be used include:

4,4'-isopropylidenediphenol;
4,4'-ethylidenediphenol;
4,4'-methylenediphenol;
4,4'-isopropylidene bis(2,6-dichlorophenol);
4,4'-isopropylidene bis(2,6-dibromophenol);
bis(2-hydroxy-3-tert-butyl-5-methylbenzyl) durene;
4,4'-(2-norcamphanylidene) diphenol;
4,4'-(cyclohexylidene) diphenol;
4,4'-(hexahydro-4,7-methanoindan-5-ylidene) diphenyl;
4,4'-(hexahydro-4,7-methanoindan-5-ylidene) di-o-cresol; and
4,4'-(methylnorcamphan-2-ylmethylene) diphenol.

In the aromatic compounds it is desirable to have the hydroxy groups in para or meta positions in the compound.

We have found that when the hydroxy groups are in ortho positions the products are usually cyclic organophosphorus compounds and not organophosphorus polymers.

Moreover, we have found that the monocyclic dihydroxy phenols such as hydroquinone or resorcinol react to form polymers which quickly hydrolyze under normal atmospheric conditions to form essentially useless decomposition products.

It is obvious that a great number of other dihydroxy compounds can be similarly employed as encompassed by the general description given hereinabove.

Suitable phosphonite esters which may be used include the dialkyl or diaryl alkyl or aryl phosphonites. For example, diphenyl phenylphosphonite, dicresyl phenylphosphonite, dimethyl phenylphosphonite, dibutyl phenylphosphonite, dioctyl phenylphosphonite, diphenyl methylphosphonite, dimethyl methylphosphonite, diethyl methylphosphonite, diisobutyl methylphosphonite, dioctyl methylphosphonite, diphenyl ethylphosphonite, diethyl ethylphosphonite, dioctyl ethylphosphonite, diphenyl octylphosphonite, dimethyl octylphosphonite, diethyl octylphosphonite, dioctyl octylphosphonite, etc.

It is obvious that a great number of additional phosphonite esters can be employed as encompassed by the definition of such esters set forth in more general terms hereinabove.

The novel polymers of this invention are useful for a number of worthwhile purposes and have various properties depending upon the nature of the reactants and the reaction conditions. The preferred polymers of this invention have softening points of at least 100° C. and are polymers of moderately high molecular weight where Q is preferably aryl and Q' is cycloalkyl or a bisphenylalkane radical. Of course, polymers of relatively low molecular weight can also be produced. The most especially preferred embodiments of this invention are high molecular weight polymers which are compositions which soften at high temperatures and can be spun into useful fibers or shaped into valuable molded articles. These polymers are extremely flame resistant and resistant to hydrolysis whereby the resulting fibers, films, coatings, moldings, or the like possess these extremely valuable attributes. Of course, these polymers can be mixed with other polymers so as to contribute flame resistance to the mixture. As a further alternative, the linear organophosphorus polymers of this invention can be coated upon other polymers so as to provide an extremely flame-resistant product. The novel polymers of this invention have unique physical properties and hydrolytic resistance which make them especially adaptable for utility for the purposes outlined, although they are obviously valuable for many other purposes.

The novel polymers of this invention wherein Q' is alkylene or polyoxyalkylene are characterized by lower softening points which can be as low as 0° C. or lower. Such polymers are of great value as plasticizers in flame resistant resinous compositions which have excellent resistance to hydrolysis and deterioration due to other causes including oxidation. Such resinous compositions form valuable molded products, films, and the like. Such polymers are also useful as functional fluids, coatings, lubricants, etc.

This invention can be further illustrated by the following examples of preferred embodiments although it will be understood that these examples are included merely for purposes of illustration and are not intended to limit the scope of the invention unless otherwise specifically indicated:

*Example I*

This polymer was derived from diphenyl phenylphosphonite and 4,4'-isopropylidenediphenol. Diphenyl phenylphosphonite (29.4 g., .1 mole), 4,4'-isopropylidenediphenol (24 g., .1 mole, and sodium aluminate (.1 g.) were mixed in a round-bottom flask. The reaction flask was lowered into a molten metal bath which had been preheated to 125° C. The reaction mixture was stirred and maintained under a blanket of nitrogen while the temperature was gradually raised to 190° C. over a 3-hr. period. Then a slight vacuum was applied in order to distill out the phenol. As the viscosity of the melt increased, the vacuum was lowered to 1.2 mm. and the reaction temperature was increased to 225° C. A total of 17.7 g. of phenol was collected during the condensation. When no more phenol was liberated, the polymeric mass was cooled under vacuum.

The polymer obtained was a hard transparent material which was melt-spun into useful flame-resistant fibers. These fibers can be woven into fabrics for wearing apparel or used as unwoven insulation against heat or cold, especially where flame resistance and hydrolytic stability are important.

*Example II*

This polymer was derived from dibutyl phenylphosphonite and trans-1,4-cyclohexanedimethanol. This colorless polymer was prepared from dibutyl phenylphosphonite (25.4 g., .1 mole), trans-1,4-cyclohexanedimethanol (14.4 g., .1 mole) and sodium aluminate (.1 g.) according to the general procedure described in Example I. Similar results were obtained using a 30/70 mixture of cis and trans-1,4-cyclohexanedimethanol instead of trans-1,4-cyclohexanedimethanol.

*Example III*

This polymer was derived from diphenyl phenylphosphonite and 2,2,4,4-tetramethylcyclobutanediol. This polymeric material was prepared from diphenyl phenylphosphonite (.1 mole) and 2,2,4,4-tetramethylcyclobutanediol (.1 mole) using sodium diphenyl phosphite (.1 g.) as the catalyst according to the procedure described in Example I. The theoretical amount of phenol was liberated during the reaction. Fibers obtained from this polymer were similar to those described in Example I.

*Example IV*

This polymer was derived from diphenyl methylphosphonite and 4,4'-isopropylidenediphenol. This polymer was prepared from diphenyl methylphosphite (.2 mole), 4,4'-isopropylidenediphenol (.2 mole) and titanium isopropoxide (.1 g.) according to the procedure of Example I. Fibers obtained from this polymer were similar to those described in Example I.

*Example V*

This polymer was derived from bis(2-ethylhexyl) phenylphosphonite and 2,2,4,4-tetramethylcyclobutanediol. This polymer was prepared from bis(2-ethylhexyl) phenylphosphonite (0.5 mole), 2,2,4,4-tetramethyl-cyclobutanediol (0.5 mole) and sodium ethoxide (0.1 g.) according to the procedure described in Example I. Fibers obtained from this polymer were similar to those described in Example I.

*Example VI*

This polymer was derived from diethyl 2-ethylhexylphosphonite and 1,5-pentanediol. This transparent polymeric material was prepared from diethyl 2-ethylhexylphosphonite (1.0 mole), 1,5-pentanediol (1.0 mole) and sodium aluminate (0.2 g.) according to the procedure of Example I. This polymer could be formed into fibers but had a softening temperature lower than that normally useful for most fiber purposes. This polymer was therefore much more valuable as a plasticizer in vinyl and other plastics where excellent stability and flame resistance were desired. This polymer also contributes to the oxidative stability of plastic compositions including moldings, films and coatings. It is also valuable in preventing discoloration due to the presence of sulfur in such plastics.

*Example VII*

The polymer was prepared from equimolecular proportions of dibutyl n-butyphosphonite and poly(ethylene glycol) having a molecular weight of about 1,000 using sodium aluminate as the catalyst according to the process of Example I. The polymer was similar to that described in Example VI.

The polymers of this invention are derived from phosphonites wherein the phosphorus atom is in its trivalent form. No polymers similar to those of this invention can be prepared using the corresponding pentavalent phosphorus compounds.

The prior art teaches that a pentavalent phosphorus acid dichloride, e.g. $RPOCl_2$, be reacted with a monocyclic dihydric phenol, e.g. hydroquinone, to produce a polymer. However, such a polymer from the trivalent phosphorus analog, e.g. $RPCl_2$, is so susceptible to hydrolytic degradation that it is not considered to have any practicable utility. Moreover, when $RPCl_2$ is reacted with an alkylene glycol a chlorhydrin is obtained, not an ester, and no polymer is produced. Hence, it is readily apparent that quite significant differences exist between the analogus compounds wherein phosphorus is trivalent or pentavalent, and it is not possible to make reliable predictions as to any given reaction or the properties of any such unpredictable product.

Although the invention has been described in considerable detail with reference to certain preferred embodiments thereof it will be understood that variations and modifications can be effected without departing from the spirit and scope of the invention as described hereinabove and as defined in the appended claims.

Applications of the same inventors which also disclose organophosphorus polymers from phosphonite esters include Serial No. 803,582, filed April 4, 1959 (now abandoned), describing condensation with organic diamines and Serial No. 803,583, filed April 4, 1959 (now U.S. Patent No. 3,030,340, issued on April 17, 1962) describing condensation with organic aminoalcohols.

We claim:

1. A solid highly polymeric linear organophosphorus polymer having antioxidant properties, a softening temperature above 0° C., being flame resistant, resistant to hydrolysis and having a polymer chain consisting essentially of recurring structural units having the following formula:

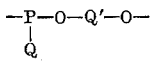

wherein Q represents a monovalent organic radical selected from the group consisting of aliphatic hydrocarbon radicals containing from 1 to 12 carbon atoms, aromatic hydrocarbon radicals containing from 6 to 12 carbon atoms and aralkyl hydrocarbon radicals containing from 7 to 12 carbon atoms, and Q' represents a bivalent organic radical selected from the group consisting of alkylene radicals containing from 4 to 20 carbon atoms, polyoxyalkylene radicals containing from 4 to 900 carbon atoms, cycloalkylene radicals containing from 6 to 20 carbon atoms and bisphenylalkane radicals containing from 13 to 25 carbon atoms.

2. A linear organophosphorus polymer as defined by claim 1 wherein Q is phenyl radical and Q' is a 4,4'-isopropylidenediphenyl radical.

3. A linear organophosphorus polymer as defined by claim 1 wherein Q is a phenyl radical and Q' is a 1,4-cyclohexylenedimethylene radical.

4. A linear organophosphorus polymer as defined by claim 1 wherein Q is a methyl radical and Q' is a 4,4-isopropylidenediphenyl radical.

5. A linear organophosphorus polymer as defined by claim 1 wherein Q is a phenyl radical and Q' is 2,2,4,4-tetramethyl-1,3-cyclobutylene radical.

6. A linear organophosphorus polymers as defined by claim 1 wherein Q is a 2-ethylhexyl radical and Q' is a 1,4-butylene radical.

7. A linear organophosphous polymer as defined by claim 1 wherein Q' has a cyclic structure.

8. A fiber of a solid highly polymeric linear organophosphorous polymer having a softening temperature above 0° C., being flame resistant, resistant to hydrolysis and having a polymer chain consisting essentially of recurring structural units having the following formula:

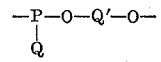

wherein Q represents a monovalent organic radical selected from the group consisting of aliphatic hydrocarbon radicals containing from 1 to 12 carbon atoms, aromatic hydrocarbon radicals containing from 6 to 12 carbon atoms and aralkyl hydrocarbon radicals containing from 7 to 12 carbon atoms, and Q' represents a bivalent organic radical selected from the group consisting of alkylene radicals containing from 4 to 20 carbon atoms, polyoxyalkylene radicals containing from 4 to 900 carbon atoms, cycloalkylene radicals containing from 6 to 20 carbon atoms and bisphenylalkane radicals containing from 13 to 25 carbon atoms.

9. A process for preparing a solid highly polymeric linear organophosphorus polymer capable of being formed into fibers, having a softening temperature above 0° C., being flame resistant, resistant to hydrolysis and having a polymer chain consisting essentially of recurring structural units having the following formula:

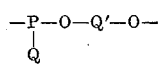

wherein Q represents a monovalent organic radical selected from the group consisting of aliphatic hydrocarbon radicals containing from 1 to 12 carbon atoms, aromatic hydrocarbon radicals containing from 6 to 12 carbon atoms and aralkyl hydrocarbon radicals containing from 7 to 12 carbon atoms, and Q' represents a bivalent organic radical selected from the group consisting of alkylene radicals containing from 4 to 20 carbon atoms, polyoxyalkylene radicals containing from 4 to 900 carbon atoms, cycloalkylene radicals containing from 6 to 20 carbon atoms and bisphenylalkane radicals containing from 13 to 25 carbon atoms, said process comprising heating in the range of from about 100° C. to about 400° C., in the presence of a condensation catalyst selected from the group consisting of alkali metal aluminates, titanium alkoxides, alkali metals, alkali metal amides, alkali metal dialkyl phosphites, alkali metal diaryl phosphites, alkali metal alkoxides, alkali meta titanium alkoxides, aluminum trichloride and dibutyltin oxides, equimolar proportions of each of those compounds having the following formulas:

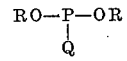

and

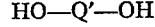

wherein R, Q and Q' are defined above.

10. A process as defined by claim 9 wherein said catalyst is sodium aluminate.

11. A process as defined by claim 9 wherein Q is a phenyl radical and Q' is a 4,4'-isopropylidenediphenyl radical.

12. A process as defined by claim 9 wherein Q is a phenyl radical and Q' is a 1,4-cyclohexylenedimethylene radical.

13. A process as defined by claim 9 wherein Q is a methyl radical and Q' is a 4,4'-isopropylidenediphenyl radical.

14. A process as defined by claim 9 wherein Q is a phenyl radical and Q′ is a 2,2,4,4-tetramethyl-1,3-cyclobutylene radical.

15. A process as defined by claim 9 wherein Q is a 2-ethylhexyl radical and Q′ is a 1,4-butylene radical.

16. A process as defined by claim 9 wherein Q′ has a cyclic structure, said polymer having a softening temperature above 100° C.

References Cited by the Examiner

UNITED STATES PATENTS

| | | | |
|---|---|---|---|
| 2,058,394 | 10/1936 | Arvin | 260—47 |
| 2,435,252 | 2/1948 | Toy | 260—27 |
| 2,856,369 | 10/1958 | Smith | 260—2 |
| 2,891,915 | 6/1959 | McCormack | 260—28 |
| 2,900,365 | 8/1959 | Haven | 260—2 |
| 2,952,666 | 9/1960 | Coover | 260—2 |

FOREIGN PATENTS 893,674 4/1962 Great Britain.

SAMUEL H. BLECH, *Primary Examiner.*

WILLIAM H. SHORT, *Examiner.*

J. C. MARTIN, *Assistant Examiner.*